United States Patent [19]

Fava

[11] 4,122,130

[45] Oct. 24, 1978

[54] MOLDABLE BLEND OF POLYCARBONATE AND TERPOLYMER OF RUBBER STYRENE-MALEIMIDE

[75] Inventor: Ronald Anthony Fava, Monroeville, Pa.

[73] Assignee: Arco Polymers Inc., Philadelphia, Pa.

[21] Appl. No.: 794,496

[22] Filed: May 6, 1977

[51] Int. Cl.$^2$ .................... C08G 63/62; C08L 67/06
[52] U.S. Cl. .................................. 260/873; 526/258
[58] Field of Search ...................... 260/873; 526/258

[56] References Cited

U.S. PATENT DOCUMENTS

| | | | |
|---|---|---|---|
| 3,882,192 | 5/1975 | Elghani et al. | 260/873 |
| 3,919,354 | 11/1975 | Moore et al. | 260/880 R |
| 3,966,842 | 6/1976 | Ludwig et al. | 260/873 |
| 3,998,907 | 12/1976 | DiGiulio | 260/857 L |

Primary Examiner—Allan Lieberman
Attorney, Agent, or Firm—John R. Ewbank; Lewis A. Young

[57] ABSTRACT

Thermoplastic molding compositions consist of a blend of:

a. 10–90% by weight of a polycarbonate of a dihydric phenol and a derivative of carbonic acid.
b. 10–90% by weight copolymer of three components:
(aa) a rubbery block polymer prepared in a stereo-specific system using from 5 to 35% vinyl aromatic compound and from 65 to 95% conjugated alkyldiene,
(bb) an amino nitrogen derivative of an ethylenically unsaturated dicarboxylic acid, and
(cc) vinyl aromatic composition, said copolymer containing from about 5% to about 35% rubbery block polymer, from about 5% to about 35% amino nitrogen derivative of an ethylenically unsaturated dicarboxylic acid, and from about 60% to 90% vinyl aromatic composition.

5 Claims, No Drawings

MOLDABLE BLEND OF POLYCARBONATE AND TERPOLYMER OF RUBBER STYRENE-MALEIMIDE

RELATED INVENTIONS

Reference is made to the application of Ronald A. Fava, Ser. No. 789,152 filed Apr. 19, 1977 concerning "Thermoplastic Molding Compositions Comprising Styrene-Maleimide and Polycarbonate," all the disclosure of which is deemed here reiterated and incorporated herein.

BACKGROUND OF INVENTION

This invention relates to thermoplastic molding composition having an advantageous combination of characteristics not readily attainable from competitive materials.

Heretofore prior technologists have established that most thermoplastic polymers are insoluble in other thermoplastic polymers. Most attempts to mix pellets of different molding composition at the time they are fed to an extruder lead to extrudates having fracture lines at the boundaries amongst the different compositions. Plastic "alloys" which contain a plurality of thermoplastic compositions have been discovered, but represent a minority of the theoretical number of possible mixtures. As greater knowledge of attractive compatibilities of blends has accumulated through the decades, some basis has evolved for selecting plausible fields for research on thermoplastic blends. Because incompatibility remains the dominating rule, any discovery of a useful blend of different thermoplastics represents a pragmatic invention which could not have been predicted on the basis of previous publications.

In an effort to improve resistance to impact, rubber-modified plastics have been prepared by copolymerizing a mixture of maleic anhydride and styrene in the presence of rubber, as shown in U.S. Pat. No. 3,919,354. Blends of such rubber-modified plastic and polycarbonate resins are described in U.S. Pat. No. 3,966,842.

Example 7 of Elghani et al U.S. Pat. No. 3,882,192 describes a thermoplastic molding composition blended from 40 parts of polycarbonates of a dihydric phenol and a derivative of carbonic acid, 35 parts of polyvinylchloride, and 25 parts of a copolymer of styrene and maleic anhydride (88:12 molar ratio) having a Vicat temperature of 110° C.

Maleimide, N-methyl maleimide, maleic diamide, bis(N-methyl) maleic diamide, and related compounds have been studied by scholars but have not been reported as used significantly in the tonnage production of copolymers. However such compounds have been copolymerized with styrene in research projects. Outstandingly advantageous properties have been discovered for copolymers of styrene and such compounds, conveniently designated as styrene-maleimide copolymers. Notwithstanding the superior characteristics of such styrene-maleimide copolymers, the market for such copolymers has been small enough that it has been efficient to produce such copolymers by copolymerizing styrene and maleic anhydride and thereafter treating the copolymer with methyl amine or ammonia to obtain such styrene-maleimide copolymers. DiGiulio U.S. Pat. No. 3,998,907 describes a method of preparing maleimide-containing copolymers by reacting amine or ammonia with particles of the copolymer comprising maleic anhydride under autogenous pressure at 125° to 200° C.

Notwithstanding the abundance of literature pertinent to polycarbonates and blends comprising polycarbonates, there continued to be a persistent demand for a polycarbonate blend suitable for molding items at a convenient temperature, and a failure by others to meet such demand satisfactorily.

SUMMARY OF INVENTION

In accordance with the present invention, an advantageous thermoplastic composition is prepared by heat blending polycarbonate and the imino derivative of rubber-modified styrene-maleic anhydride, each thermoplastic component being present in a concentration within the range from 10% to 90%.

The invention is further clarified by reference to a plurality of examples.

EXAMPLES 1-3

A series of samples were prepared by melting plastic pellets in an extruder, mixing much more thoroughly in the extruder than is conventional, whereby a complete blending of the thermoplastic materials was achieved, and then extruding the thoroughly mixed thermoplastic compositions.

Composition A was a polycarbonate prepared from the high molecular weight carbonate ester derivative of bis(4 hydroxyphenyl)-2,-2-propane.

Composition B was a copolymer of three components. A terpolymer was prepared by first preparing an organic solution of a block rubbery copolymer derived from the butyl lithium catalytic polymerization of 85% butadiene and 15% styrene. A rubbery block copolymer marketed by Firestone as Steareon 720 is suitable. Styrene and maleic anhydride are copolymerized in such solution so that the terpolymer contains about 13% butadiene, about 7% maleic anhydride and about 80% styrene. The method of Example 1 of DiGiulio U.S. Pat. No. 3,998,907, using aqueous ammonia at a temperature of about 147° C. for about 12 hours at a pressure of about 5 atmospheres was employed to imidize the terpolymer, which then contained about 7% maleimide.

The compositions for Examples 1, 2, and 3, were blends containing 25%, 50% and 75% respectively of rubbermodified styrene-maleimide (7%) copolymer (Composition B) and the balance polycarbonate (Composition A).

The test samples were injection molded. After injection molding, the specimens were tested by an appropriate series of standard procedures. The Izod notched impact test procedure is known as ASTM-D256. The Vicat heat distortion temperature was measured by ASTM-D1525.

Data relating to the controls and examples are shown in Table 1.

Table 1

|  | Control J | Example 1 | Example 2 | Example 3 | Control P |
|---|---|---|---|---|---|
| Code composition | A |  |  |  | B |
| % polycarbonate | 100 | 75 | 50 | 25 | 0 |
| % rubber-styrene-maleimide | 0 | 25 | 50 | 75 | 100 |
| Tensile yield psi | 8,300 | 7,700 | 6,700 | 5,400 | 4,400 |
| Tensile break psi | 10,000 | NA | 6,000 | 5,300 | 4,400 |
| Tensile along psi | 270 | NA | 13 | 6.3 | 28. |
| Modulus ($10^5$ psi) | 3.3 | 3.5 | 3.5 | 3.4 | 3.3 |
| Flexure modulus ($10^5$ psi) | 3.1 | 3.5 | 3.1 | 3.1 | 3.2 |

Table 1-continued

|  | Control J | Example 1 | Example 2 | Example 3 | Control P |
|---|---|---|---|---|---|
| Izod (ft lb/in) | 9.2 | 8.9 | 10.9 | 0.2 | 1.5 |
| Vicat (° F) | 310 | 296 | 288 | 266 | 261 |

Said data establish that the transparent macromolecular organic alloy has a high heat resistance and a highly advantageous superior stiffness to that of polycarbonate. Moreover, rubber-modified styrene-maleimide resin is less costly than polycarbonate, whereby some of the advantages of polycarbonates can be utilized in the production of articles sold at a price significantly below the price at which a molded pure polycarbonate article would be expected to sell.

EXAMPLE 4

Compositions are prepared from thermoplasticly blended polycarbonates and rubber-modified styrene-maleimide using concentrations of polycarbonate within the 9–25% range, showing many of the advantages of the blend containing 25% polycarbonate. Compositions are prepared from thermoplastically blended polycarbonates and rubber-modified styrene-maleimide using concentrations of rubber-modified styrene-maleimide within the 9–25% range, showing many of the advantages of the blend containing 25% of the rubber-modified styrene-maleimide.

EXAMPLE 5

Blends of 50% polyphenylenecarbonate and 50% copolymer of rubber-modified styrene-maleimide containing about 8% maleimide are prepared by preparing solutions of components in halogenated organic solvent, mixing such solutions, volatilizing the solvents, and extruding the thus precipitated mixture. The characteristics of the samples are equivalent to those of Example 2. A basis is thus established for the conclusion that the advantageous results of Example 2 are attributable to the advantageous alloying propensities of the components and not primarily to the method of blending.

EXAMPLE 6

Blends of polycarbonate and rubber-modified styrene-maleimide are prepared throughout the 10 to 90% and 90 to 10% ranges, using a series of rubber-modified styrene-maleimide copolymers. It is thus established the attainment of advantageous results is not jeopardized by conventional variations in the method of preparing the maleimide, the use of ammonia, the use or choice of lower alkyl primary amine, or mixtures thereof, and similar modifications. The minimum amount of maleimide in the copolymer must be at least 5%, and lesser amounts fail to impart to the blends the desirable properties which characterize the blends of the present invention. The maximum amount of maleimide in the terpolymer must not be greater than 35% because the extrudability of the hot mix is impaired by excessive concentrations of the maleimide. Some association of the imide group of the copolymer chain and the carbonate group of the polycarbonate chain is indicated as a synergistic advantage of the unique alloys of the present invention. The rubbery block copolymer must be present in a concentration within the range from 5 to 35%. The amount of styrene in the terpolymer must be from 60% to 90%.

EXAMPLE 7

Blends of polycarbonate and styrene-maleimide are prepared throughout the 10 to 90% and 90 to 10% ranges, using a series of polycarbonates. Satisfactory results are obtained only with polycarbonates which are predominantly aromatic. Polycarbonates derived from hydroquinone, bis 4-hydroxy diphenylmethane, 2,6-dimethyl hydroquinone, and other types of phenylene carbonate polymers are established as useful polycarbonates for the advantageous blends of the present invention.

Although it is convenient to refer to maleimide, the advantageous results are attributable to the amide linkage in an ethylenically unsaturated diccarboxylic acid. Suitable acids are maleic acid, fumaric acid, itaconic acid, citraconic acid, mesaconic acid, ethyl maleic acid, methyl itaconic acid, chloromaleic acid, dichloromaleic acid, bromomaleic acid, and dibromomaleic acid. Ammonia, methyl amine, ethyl amine, propyl amine, isopropyl amine and mixtures thereof are the primary amines capable of forming imides and amides imparting the improved characteristics to the blends of the terpolymer and the polycarbonate. Such nitrogen derivatives of the ethylenically unsaturated dicarboxylic acid can be prepared by reacting the acid or its anhydride with the primary amine, ammonia, or mixture thereof.

Although it is convenient to refer to styrene, the advantages results are attributable to the use of a vinyl aryl monomer. Suitable examples of vinyl aryl monomers include styrene, alpha-methylstyrene, nuclear methylstyrenes, ethylstyrene, isopropylstyrene, tertbutylstyrene, chlorostyrenes, dichlorostyrenes, vinyl naphthalene and the like.

The block copolymers desirably are those having a major portion of blocks of conjugated diene having an average molecular weight greater than the average molecular weight of the blocks of vinyl aromatic compounds. The vinyl aromatic component generally constitutes from about 5% to about 35% of the block copolymer. The diene content desirably is from about 65 to 95%. The conjugated diene may be butadiene, isoprene, chloroprene and piperylene. Block polymers can be prepared using a solvent such as hexane for both the vinyl aromatic monomer and the diene, using 2-lithium butyl as the catalyst. Among the suitable block copolymers is Stereon 720, marketed by Firestone, and containing about 90% butadiene and about 10% styrene.

The block copolymer rubber can be dissolved in a monomeric vinyl aromatic composition such as styrene, initiating polymerization, and the ethylenically unsaturated dicarboxylic acid can be added incrementally during polymerization. U.S. Pat. No. 3,919,345, describes a method of preparing a terpolymer of rubber-modified styrenemaleic anhydride terpolymer.

Various modifications of the invention are possible without departing from the scope of the invention as set forth in the claims.

I claim:
1. A thermoplastic molding composition which comprises:
   A. from about 10% to about 90% by weight of a predominantly aromatic polycarbonate;
   B. from about 10% to about 90% by weight of a copolymer of three components:
      (aa) a rubbery block polymer prepared in a stereospecific system using from 5 to 35% vinyl aromatic compound and from 65 to 95% conjugated alkyldiene, said rubbery block copolymer constituting from 5% to 35% of the copolymer of three components,
(bb) an amine nitrogen derivative of an ethylenically unsaturated dicarboxylic acid constituting from 5% to 35% of the copolymer of three components, and
(cc) vinyl aromatic composition constituting from 60% to 90% of the copolymer of three components.

2. The composition of claim 1 in which the concentration range of each of A and B is from about 25% to about 75%.

3. The composition of claim 2 in which the concentration of each of A and B is about 50%.

4. The composition of claim 1 in which the polycarbonate is a polyphenylene carbonate.

5. The composition of claim 1 in which said copolymer of three components is prepared by subjecting a copolymer of a a rubbery block polymer prepared in a stereospecific system using from 5% to 35% vinyl aromatic compound and from 65% to 95% conjugated alkyldiene, said rubbery block copolymer constituting from 5% to 35% of the copolymer of three components, from 5% to 35% maleic anhydride, and from 60% to 90% styrene to a basic aqueous nitrogenous system at a temperature of from about 125° to about 200° C. at an autogenous pressure for 0.5 to 48 hours and thereafter depressurizing and devolatilizing the product.

* * * * *